(12) United States Patent
Augenstein et al.

(10) Patent No.: US 6,896,191 B2
(45) Date of Patent: May 24, 2005

(54) HEATING DEVICE SUITABLE FOR MOTOR VEHICLES

(75) Inventors: Claus Augenstein, Gerlingen (DE); Armin Gramlich, Vaihingen (DE); Oezguer Kamsiz, Knittlingen (DE); Kuno Lindauer, Mühlacker (DE); Ralf Maus, Korntal-Münchingen (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 10/234,834

(22) Filed: Sep. 5, 2002

(65) Prior Publication Data

US 2003/0062036 A1 Apr. 3, 2003

(30) Foreign Application Priority Data

Sep. 6, 2001 (DE) .......................................... 101 11 845

(51) Int. Cl.⁷ ................................................. B60H 1/02
(52) U.S. Cl. .......................... 237/12.3 B; 237/12.3 R; 126/247; 122/26
(58) Field of Search ..................... 237/12.3 B, 12.3 R; 122/26; 126/247

(56) References Cited

U.S. PATENT DOCUMENTS

| 4,454,861 | A | * | 6/1984 | Grenier ....................... 126/247 |
| 4,974,778 | A | * | 12/1990 | Bertling .................. 237/12.3 B |
| 5,230,326 | A |   | 7/1993 | Suzuki et al. |
| 5,957,121 | A | * | 9/1999 | Suzuki et al. ................ 126/247 |
| 6,042,017 | A | * | 3/2000 | Ban et al. .............. 237/12.3 R |
| 6,138,920 | A |   | 10/2000 | Ban et al. |

FOREIGN PATENT DOCUMENTS

| DE | 42 36 624 C2 | 7/1996 |
| DE | 197 43 148 A1 | 4/1998 |
| DE | 198 18 051 A1 | 10/1998 |
| DE | 198 27 097 A1 | 12/1999 |
| DE | 199 48 035 A1 | 4/2000 |
| DE | 199 40 536 C1 | 8/2000 |

* cited by examiner

Primary Examiner—Derek S. Boles
(74) Attorney, Agent, or Firm—Foley & Lardner LLP

(57) ABSTRACT

The invention relates to a heating device, in particular for motor vehicles, for generating frictional heat by liquid friction with a housing which is arranged in a stationary position and has a working space and a motor-driven rotor in the working space.

4 Claims, 4 Drawing Sheets

HEATING DEVICE SUITABLE FOR MOTOR VEHICLES

CROSS-REFERENCE TO RELATED PATENT APPLICATIONS

The right of priority under 35 U.S.C. §119(a) is claimed based on German Patent Application No. 101 44 845.7, filed Sep. 6, 2001, the entire disclosure of which is hereby incorporated by reference.

BACKGROUND OF THE INVENTION

The invention relates to a heating device, in particular for a motor vehicle, for generating frictional heat by liquid friction.

A heating device of this general type is disclosed by DE-A 198 27 097, which is commonly assigned with the present application. This known heating device is an auxiliary heater for motor vehicles with consumption-optimized engines, in which, therefore, there is relatively little waste heat available from the engine for heating purposes. In the known design, the heating warmth is generated via liquid friction and is dissipated to the coolant of the engine. A rotor which rotates in a working space of the heating device is driven by the internal combustion engine of the motor vehicle. The rotor, together with a wall of the heating device which is fixed to the housing, forms a working gap which is filled with viscous liquid. The shear friction of the viscous liquid in the working gap generates heat which is dependent on the transmitted torque and the engine speed. To limit the heating output to a defined level, it is provided, in the known device, for the rotor to be arranged axially movably on the drive shaft, so that the working gap can be increased in size, and in this way the heating output can be controlled. The axially movable arrangement of the rotor on the drive shaft, which requires a corresponding linear bearing, entails a structural outlay that increases the production costs of a heating device of this type, which is produced in large series for motor vehicles.

SUMMARY OF THE INVENTION

One object of the invention is to provide an improved heating device of the type described above.

It is also an object of the invention to provide an improved method for controlling the heat output of a drive power source in a motor vehicle.

Another object of the invention is to provide an improved motor vehicle embodying the heating device according to the invention.

In accordance with one aspect of the present invention, there has been provided a heating device suitable for use in a motor vehicle to generate frictional heat, comprising: a housing that is arranged in a fixed position and includes a working space and a reservoir space which are divided from one another by a partition and are in fluid communication via at least one feed portion having a feed opening and a return portion having a return opening in order to allow circulation of a viscous liquid in a liquid circuit; a motor-driven rotor rotatably mounted within the housing and including a centrifugal disk that rotates in the working space; a wall member fixed to the housing, wherein the rotor and the wall member form a working gap for generating heat by fluid friction in response to rotation of the rotor; a cooling chamber associated with the housing for circulation of a coolant, the cooling chamber being in heat transfer relationship with the wall member; and a control valve arranged in the return portion of the liquid circuit.

In accordance with another aspect of the invention, there is provided a method for controlling the heating output of a heating device as defined above, comprising controlling the static pressure of the viscous liquid in the working space in such a manner that it does not exceed a predetermined value $P_{max}$.

In accordance with yet another aspect of the invention, there is provided a motor vehicle comprising a power source including a motor, a heating system for the vehicle including a heater through which a coolant circulates, and an auxiliary heating device for supplying heat to the coolant in response to rotation of the motor, wherein the auxiliary heating device comprises a heating device as defined above.

Further objects, features and advantages of the present invention will become apparent from the detailed description of preferred embodiments that follows, when considered together with the accompanying figures of drawing.

DETAILED DESCRIPTION OF THE PREFERRED EMBODIMENTS

According to the invention, a control valve is arranged in the return part of the viscous liquid circuit in the heating device. This relatively simple design measure allows the pressure of the viscous liquid in the working chamber and therefore also in the working gap to be controlled, which at the same time results in the heating output being controlled. A linear bearing, which is subject to wear, can be dispensed with, since the rotor is arranged fixedly on the drive shaft in the axial direction. Overheating, which could even lead to the viscous liquid being destroyed, is avoided. Furthermore driving output of the internal combustion engine of the motor vehicle is also saved, since the drive moment required for the rotor is reduced with the reduction in pressure. This measure is based on the discovery that the static pressure of the viscous liquid in the working space and therefore also in the working gap is important for the torque which can be transmitted and therefore also for the heating output.

In one advantageous configuration of the invention, this control valve may be designed in various ways, for example, as a hydraulic pressure relief valve with a defined passage characteristic. This design is particularly inexpensive and is robust in operation.

In a further configuration of the invention, the control valve may also be designed as an electrically actuated, proportional or cyclical valve. This design has the advantage that, using data and parameters in the engine management system, it is possible to act externally on the control of the heating output of the heating device. By way of example, in a preferred embodiment, the heating output can be controlled as a function of the coolant temperature or of the engine speed. The cyclical valve can be arranged relatively easily in the reservoir space and in the intermediate disk of the heating device.

In a further configuration of the invention, this control valve may also be designed as a bimetal-actuated valve, which senses the temperature of the viscous medium in the heating device and opens the control valve as a function of a maximum temperature. A temperature-dependent valve of this type also protects the heating device from overheating and destroying the viscous liquid.

In one advantageous configuration of the invention, the control valve may either be provided as an additional valve, i.e., as a bypass valve to the return valve, or may be formed as an integral valve with two functions for return and control.

Finally, in a further aspect of the invention, a method for controlling the heating output is also advantageously provided. According to this method, the pressure of the viscous liquid in the working space or in the working gap is controlled, specifically in such a manner that, when a maximum threshold value is exceeded, pressure relief takes place, and this simultaneously leads to control of the heating output.

Figure 1:
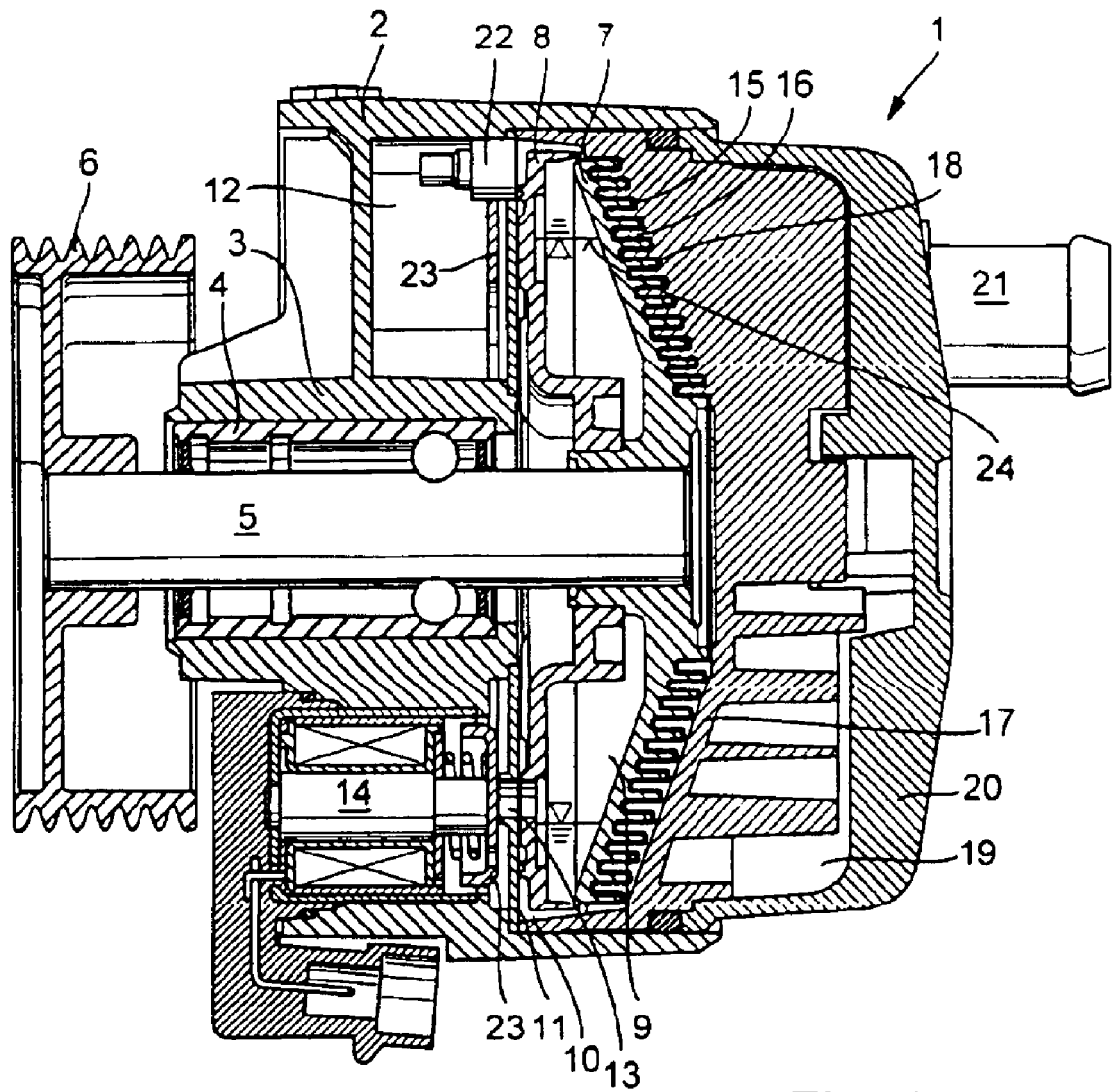
FIG. 1 is a cross-sectional view showing an axial section through a heating device with a hydraulic pressure relief valve.

Turning now to the drawings, FIG. 1 shows a heating device 1 for motor vehicles, i.e., what is known as an auxiliary heater for consumption-optimized engines. The heating device 1 comprises a stationary housing 2 which is secured in the engine compartment of a motor vehicle (not shown in further detail). A drive shaft 5 bears a pulley 6 outside the housing 2, and inside the housing bears a rotor 7 which is connected to the drive shaft 5 in a rotationally fixed manner. The drive shaft 5 is mounted in housing 2 via a hub 3 and a rolling-contact bearing 4. The rotor 7 is assigned a centrifugal disk 8, which is likewise rotationally fixed to the drive shaft.

Rotor 7 and centrifugal disk 8, which are both axially fixed on the drive shaft and between them form a space 9, rotate together, i.e., synchronously, in a working space 10. The latter is divided from a reservoir space 12 by a partition 11, a feed bore 13 and a return bore (not shown) arranged in the partition 11. The feed bore 13 is actuated via a solenoid valve 14, specifically by means of a rocker lever 23 which at the same time controls the return bore (not shown) and is explained in more detail below, with reference to the description of FIG. 3. On its side which is remote from the space 9, the rotor 7 is provided with annular ribs 15 which engage in corresponding annular ribs 16 of a wall 17 fixed to the housing and which form a meandering working gap 18 therewith. The working gap 18, the space 9, the working space 10 and the reservoir space 12 are in fluid communication and are filled with a viscous liquid, e.g., a commercially available silicone oil.

On the side of the wall 17 which is remote from the working gap 18 there is a cooling chamber 19, which is closed off from the outside by a cover 20 and is in communication, via a connection piece 21, with the coolant circuit (not shown in more detail) of the internal combustion engine and therefore with the heater of a conventional heating installation (not shown) of the motor vehicle. A further coolant connection piece is not visible in the drawing and lies directly behind the connection piece 21. To this extent, the cooling chamber 19 has a coolant inlet and a coolant outlet, in order to dissipate the heat which is formed in the working gap 18.

According to the invention, a control valve 22 is provided in the partition 11 for opening and closing a flow cross section (not shown in detail in the drawing) as a function of the pressure gradient between working chamber 10 and reservoir chamber 12. This hydraulic valve 22 can be of the type that is commercially available, and its opening pressure and flow characteristic are matched to the desired pressure and flow conditions in the heating device. The control valve 22 therefore opens and closes independently of the above mentioned solenoid valve 14, which controls the feed bore 13.

This heating device 1 functions as follows: The drive shaft 5 is driven via the pulley 6 by the internal combustion engine or other power plant (not shown) of the motor vehicle and for its part drives the rotor 7 and the centrifugal disk 8. When the feed bore 13 is open, oil flows out of the reservoir space 12 into the working space 10 and into the space 9. The rotation of rotor 7 and centrifugal disk 8 leads to the formation of an oil ring in the space, which ring is delimited on the inner side by an oil level 24. On account of the centrifugal forces, a pressure is active in this oil ring, forcing the oil into the working gap 18 and filling the latter with oil. On account of the shear friction which occurs in the process, heat is generated and is dissipated via the partition 17 to the coolant in the cooling space 19. The heated coolant passes into the coolant circuit of the internal combustion engine and therefore into a heater (not shown), via which the passenger compartment can be heated. If the heating output rises above a defined level, for example, as a result of an increased engine speed, the pressure relief valve 22 opens and the oil pressure in the working space and therefore also in the working gap 18 drops, and consequently the heating output is also reduced. Therefore, the generation of heat by this heating device can be controlled when a certain pressure in the working space 10 is reached.

Figure 2:
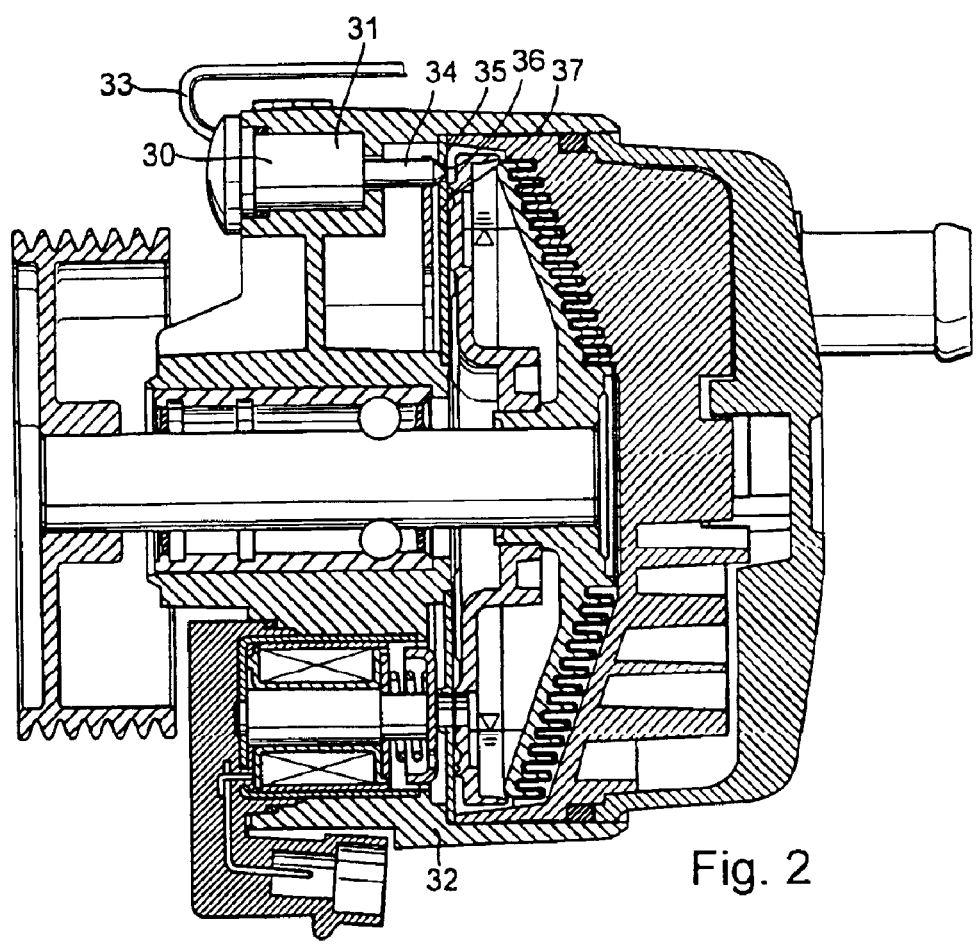
FIG. 2 is a cross-sectional view showing an axial section through the heating device with electrically actuated control valve.

FIG. 2 shows substantially the same exemplary embodiment as that shown in FIG. 1, but with the difference that a different control valve is provided, namely, an electrically actuated proportional or cyclical valve 30. This valve 30 is fitted and sealed in an externally accessible bore 31 of the housing 32 and is actuated via an electric cable 33. The valve 30 has a valve stem 34 with a conical closure part 35 which controls the size of a valve opening 36 in the partition 37. This valve 30 can be operated cyclically in a known way by being opened and closed at controlled intervals, or it can operate as a proportional valve, in which case it can also adopt intermediate positions. On the one hand, this cyclical valve 30 may be operated as a bypass valve, i.e., in addition to the return bore (not shown); on the other hand, it can also be used instead of the return bore by performing both functions, namely, that of the return control and that of the output control.

Figure 3A:
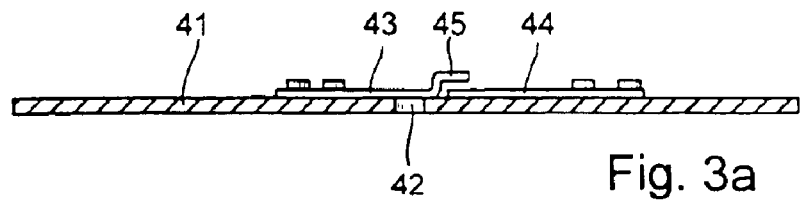
FIG. 3a is a plan view showing the intermediate disk with a bimetal-controlled valve.
Figure 3:
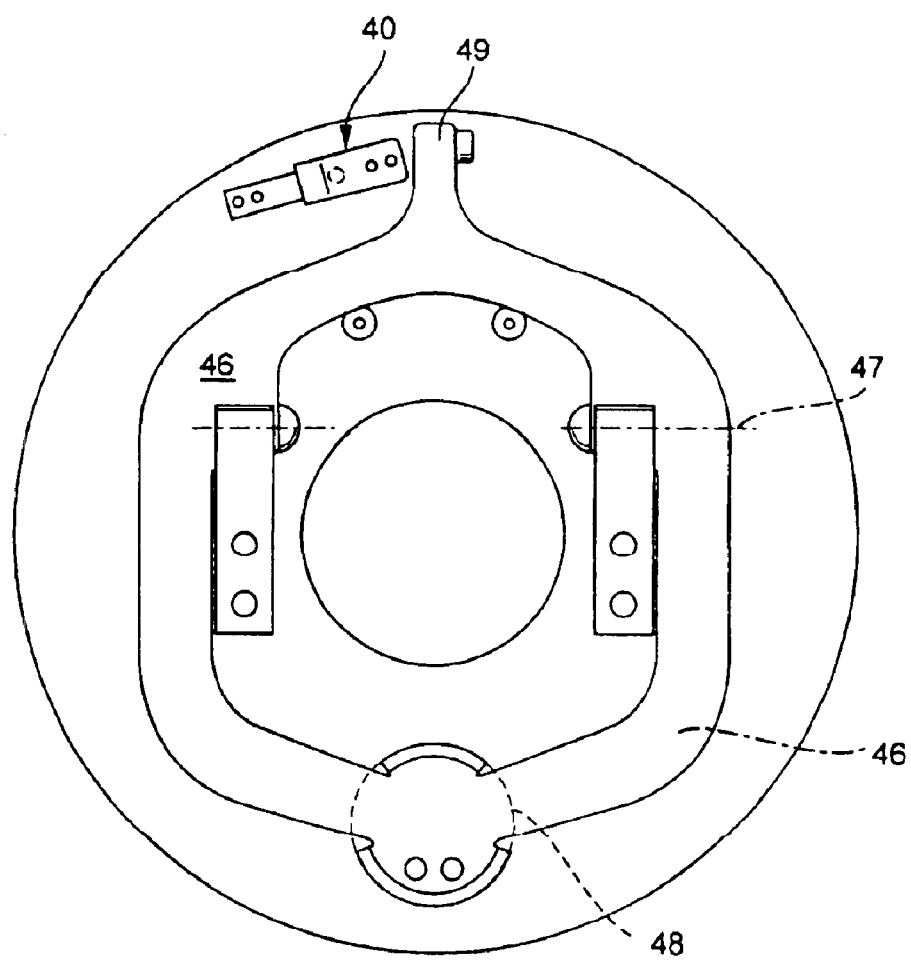
FIG. 3b is a side view showing the bimetal valve as an enlarged detail.

FIG. 3a shows a view of the intermediate disk between the working space and the reservoir space of the heating device, in connection with a further embodiment of the control valve, namely, in the form of a bimetal-controlled tongue valve 40. An enlarged view of this tongue valve 40, as a detail, is illustrated in FIG. 3b. A bypass bore 42 is closed off by a tongue-like valve lever 43 which is clamped at one end and rests on the partition 41 as a result of its spring bias. The bypass bore 42 is provided in an intermediate disk 41 which—in accordance with the above-described exemplary embodiments shown in FIGS. 1 and 2—is in each case located between the working chamber and the reservoir chamber. As an extension to this tongue-like valve lever 43, there is a bimetal 44, which is likewise clamped on one side and has its free end arranged below an angled-off shoulder 45 at the tongue tip of the tongue valve 43. The bimetal 44 will lift off the partition 41 when a defined temperature is exceeded, which will then open the tongue valve 43 and will thus open the bypass bore 42. This valve therefore responds to the temperature of the viscous medium in the reservoir chamber.

This view also illustrates a valve rocker lever 46, which can pivot about an axis 47 and is actuated by a solenoid valve 48. The rocker lever 46 has a tongue 49 which lies diametrically opposite the solenoid valve 48 and controls a return opening (not shown) behind it. To this extent, this rocker lever 46 controls both the feed bore and the return bore in the partition. Otherwise, this rocker lever corresponds to that described in DE-A 198 27 097, the entire disclosure of which is hereby incorporated by reference.

However, this rocker lever 46—when the bypass valve 40 is omitted—can also deliberately be operated cyclically, in such a manner that the return valve is simultaneously operated as the control valve.

Figure 4:
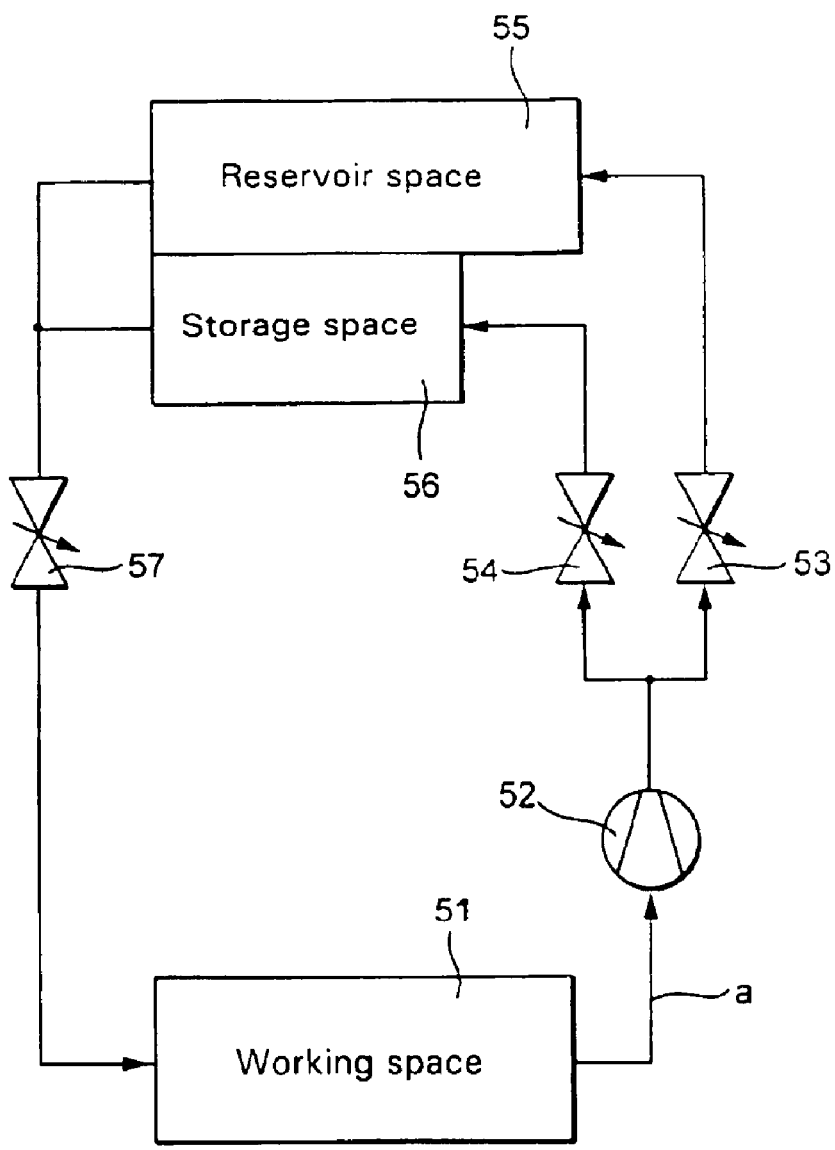
FIG. 4 is a hydraulic circuit diagram of the heating device.

FIG. 4 diagrammatically depicts the circuit 50 of the viscous medium inside the heating device, i.e., from the working space to the reservoir space and back. The viscous liquid may initially be located in the working space 51, which in FIG. 1 corresponds to the working space 10 and the working gap 18. The return from the working space 51 toward reservoir space 55 takes place in the direction of arrow a, the required pressure gradient being generated by means of an accumulator body 52. Downstream of the accumulator body 52, arranged in parallel, there are firstly the return bore 53 (controllable or not controllable) and secondly a bypass valve 54, which may correspond to the valve 22 or 30 or 40. Via these two valves or bores, the viscous liquid passes into a reservoir space 55 or a storage space 56, which in this case is illustrated as an additional space but may also form part of the reservoir space 55. The reservoir space 55 corresponds to the reservoir space 12 from the exemplary embodiment shown in FIG. 1. From the reservoir and storage spaces 55 and 56, the viscous medium flows via the feed bore or via the feed valve 57 back into the working space 51, with the feed valve 57 corresponding to the valve 14 and the feed bore 13 in FIG. 1.

Although this diagram illustrates two valves 53 and 54 arranged in parallel with one another, it is also possible for the two valves to be combined to form a single valve with two functions; this could, as has already been mentioned above, be a cyclical valve.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A heating device suitable for use in a motor vehicle to generate frictional heat, comprising: a housing that is arranged in a fixed position and includes a working space and a reservoir space which are divided from one another by a partition and are in fluid communication via at least one feed portion having a feed opening into the working space and a return portion having a return opening into the reservoir space, in order to allow circulation of a viscous liquid in a liquid circuit; a motor-driven rotor rotatably mounted within the housing and including a centrifugal disk that rotates in the working space; a wall member fixed to the housing, wherein the wall member is stationarily fixed to the housing and together with the rotor forms a working gap for generating heat by liquid friction in response to rotation of the rotor; a cooling chamber associated with the housing for circulation of a coolant, the cooling chamber being in heat transfer relationship with the wall member; and a control valve arranged in the return portion of the liquid circuit, wherein the control valve is arranged in the partition and comprises a hydraulic pressure-relief valve.

2. A method for controlling the heating output of a heating device as claimed in claim 1, comprising controlling the static pressure of the viscous liquid in the working space in such a manner that it does not exceed a predetermined value $P_{max}$, wherein the pressure in the working space is controlled by opening said pressure relief valve that is actuatable in response to pressure within the working space.

3. A motor vehicle comprising a power source including a motor, a heating system for the vehicle including a heater through which a coolant circulates, and an auxiliary heating device for supplying heat to the coolant in response to rotation of the motor, wherein the auxiliary heating device comprises a heating device as defined in claim 1.

4. A heating device as claimed in claim 1, wherein the wall member extends generally parallel to an axial face of the disk, whereby the working gap extends radially.

\* \* \* \* \*